(12) United States Patent
Park et al.

(10) Patent No.: US 8,315,386 B2
(45) Date of Patent: Nov. 20, 2012

(54) METHOD AND APPARATUS FOR PERFORMING VOIP-BASED COMMUNICATION USING BIO KEYS

(75) Inventors: Jae-Sung Park, Gunpo-si (KR);
Tae-Sung Park, Yongin-si (KR);
Jae-Hoon Kwon, Seongnam-si (KR);
Do-Young Joung, Seoul (KR);
Sung-Kee Kim, Hwaseong-si (KR);
Yong-Gyoo Kim, Seoul (KR); Ji-Wan Song, Seoul (KR)

(73) Assignee: Samsung Electronics Co., LTD (KR)

( * ) Notice: Subject to any disclaimer, the term of this patent is extended or adjusted under 35 U.S.C. 154(b) by 639 days.

(21) Appl. No.: 12/498,686

(22) Filed: Jul. 7, 2009

(65) Prior Publication Data

US 2010/0008506 A1 Jan. 14, 2010

(30) Foreign Application Priority Data

Jul. 11, 2008 (KR) .................. 10-2008-0067577

(51) Int. Cl.
*H04K 1/00* (2006.01)
*H04L 9/00* (2006.01)
*H04L 9/08* (2006.01)
*H04L 29/06* (2006.01)

(52) U.S. Cl. ........ 380/255; 380/259; 380/260; 380/262; 380/42; 380/277; 380/286; 380/44; 713/150; 713/168; 713/169

(58) Field of Classification Search .................. 380/255, 380/259–260, 262, 42, 277, 286, 44; 713/150, 713/168–169
See application file for complete search history.

(56) References Cited

U.S. PATENT DOCUMENTS

| 7,254,383 B2 | 8/2007 | Novack et al. | |
| 2005/0001028 A1* | 1/2005 | Zuili | 235/382 |
| 2005/0262418 A1* | 11/2005 | Gehrmann | 714/758 |
| 2008/0015859 A1* | 1/2008 | Novack et al. | 704/246 |

FOREIGN PATENT DOCUMENTS

KR 1020070039150 4/2007

OTHER PUBLICATIONS

Bumjin IM et al., "Implementation of Secure VoIP System based on H.235", Dec. 2002.

* cited by examiner

*Primary Examiner* — Jeffrey D Popham
*Assistant Examiner* — Kevin Bechtel
(74) *Attorney, Agent, or Firm* — The Farrell Law Firm, P.C.

(57) ABSTRACT

A method for performing an encrypted voice call between a first terminal and a second terminal supporting a Voice over Internet Protocol (VoIP)-based voice call. In the method, the first and second terminals generate and store a bio key using biographical (bio) information of a user in advance before performing a voice call, the first terminal sends a request for a voice call to the second terminal and establishing a session, the first and second terminals exchange and store a bio key stored in each terminal, and the first and second terminals generate a session shared key using the exchanged bio key and starting a Secure Real-time Transport Protocol (SRTP) session, and a restored bio key by acquiring bio information from received data. User authentication is then performed by comparing the bio key with the restored bio key.

13 Claims, 3 Drawing Sheets

METHOD AND APPARATUS FOR PERFORMING VOIP-BASED COMMUNICATION USING BIO KEYS

PRIORITY

This application claims priority under 35 U.S.C. § 119(a) to a Korean Patent Application filed in the Korean Intellectual Property Office on Jul. 11, 2008 and assigned Serial No. 10-2008-67577, the contents of which are incorporated herein by reference.

BACKGROUND OF THE INVENTION

1. Field of the Invention

The present invention relates generally to communication based on Voice over Internet Protocol (VoIP), and more particularly, to a method and apparatus for encrypting communication data with digital keys.

2. Description of the Related Art

VoIP, also known as a voice packet network, is a communication service technology that enables call processing in the general telephone network by converting voice data into Internet Protocol (IP) data packets.

Since VoIP uses an IP network, its call information can be exposed to malicious attackers. In order to solve this problem, a Public Key Infrastructure (PKI) technology is conventionally used to ensure the security of wire/wireless networks.

In the PKI technology, a sender may encrypt transmission information with a recipient's public key extracted from a recipient's electronic certificate. Upon receipt of the transmission information, a recipient may acquire contents of the information by decrypting the received information with its own private key uniquely known to the recipient.

For operation of a PKI-based security system, the system should be able to determine whether a public key, which is information available to everyone, really belongs to a user who asserts an ownership of the public key. The determination could be verified using an electronic certificate issued by a reliable third authority, i.e. a Certification Authority (CA), by attaching an electronic signature of the CA to the public key of the owner.

However, the PKI-based security system may suffer significant waste of time and costs due to generation and management of public key/private key pairs, and issuance and management of electronic certificates by the third certification authority. In addition, a user should necessarily maintain his/her own private key and public key information on a disc or in the memory of a terminal, and should also maintain other users' certificate information, which causes an increase in maintenance cost. As a result, the PKI-based security system is unsuitable for VoIP-based communication.

Therefore, there is a need for research into an encryption and authentication method suitable for VoIP-based communication.

SUMMARY OF THE INVENTION

An aspect of the present invention is to address at least the above-mentioned problems and/or disadvantages and to provide at least the advantages described below. Accordingly, an aspect of the present invention is to provide a VoIP encryption communication method and apparatus capable of performing user authentication by generating digital keys including user's biographical (bio) information.

In accordance with the present invention, there is provided a method for performing an encrypted voice call between a first terminal and a second terminal supporting a VoIP-based voice call, including generating and storing, by the first and second terminals, a bio key using bio information of a user in advance before performing a voice call, sending, by the first terminal, a request for a voice call to the second terminal and establishing a session, exchanging and storing, by the first and second terminals, a bio key stored in each terminal, generating, by the first and second terminals, a session shared key using the exchanged bio key and starting a Secure Real-time Transport Protocol (SRTP) session, and generating, by the first and second terminals, a restored bio key by acquiring bio information from received data, and performing user authentication by comparing the bio key with the restored bio key.

The generation of the bio key includes encoding and decoding the bio information, and generating a digitalized bio key by extracting information specific to the bio information.

The generation of the bio key includes generating a plurality of bio keys that correspond to a plurality of encoding/decoding schemes, respectively, and selecting any one encoding or decoding scheme to be applied to communication, among the plurality of encoding/decoding schemes.

The session shared key is generated based on a Diffie-Hellman algorithm, and the bio information may include voiceprint information included in a user's voice.

In accordance with the present invention, there is provided a communication apparatus based on a VoIP, including an external input device for receiving an audio and/or video signal, an external output device for outputting an audio and/or video signal, an encoding/decoding module for encoding a signal from the external input device and decoding a signal received through communication, a bio information extractor for extracting bio information from a signal output through the encoding/decoding module, a bio key generator for generating and managing a bio key using the bio information output from the bio information extractor, a session shared key generator for managing generation of a session shared key using the generated bio key and a bio key received from a counterpart communication apparatus, an encryption authentication unit for managing generation of a restored bio key, and authenticating encryption, and a communication module for transmitting and receiving an encrypted data packet using the session shared key.

The encoding/decoding module encodes the audio and/or video signal received for generation of a bio key, and decodes encoded audio and/or video signal.

The encoding/decoding module includes encoding and decoding units for performing various encoding and decoding schemes, and the bio key generator may generate a plurality of bio keys corresponding to bio information that is encoded and decoded by various encoding and decoding schemes, respectively.

The bio information may include voiceprint information included in a voice of a user, and the bio information extractor may extract voiceprint information included in a voice signal.

The encryption authentication unit controls the bio information extractor to extract bio information from data received from the counterpart communication apparatus, and performs encryption authentication by determining whether the bio key is identical to the restored bio key.

BRIEF DESCRIPTION OF THE DRAWINGS

The above and other aspects, features and advantages of certain preferred embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

Figure 1:
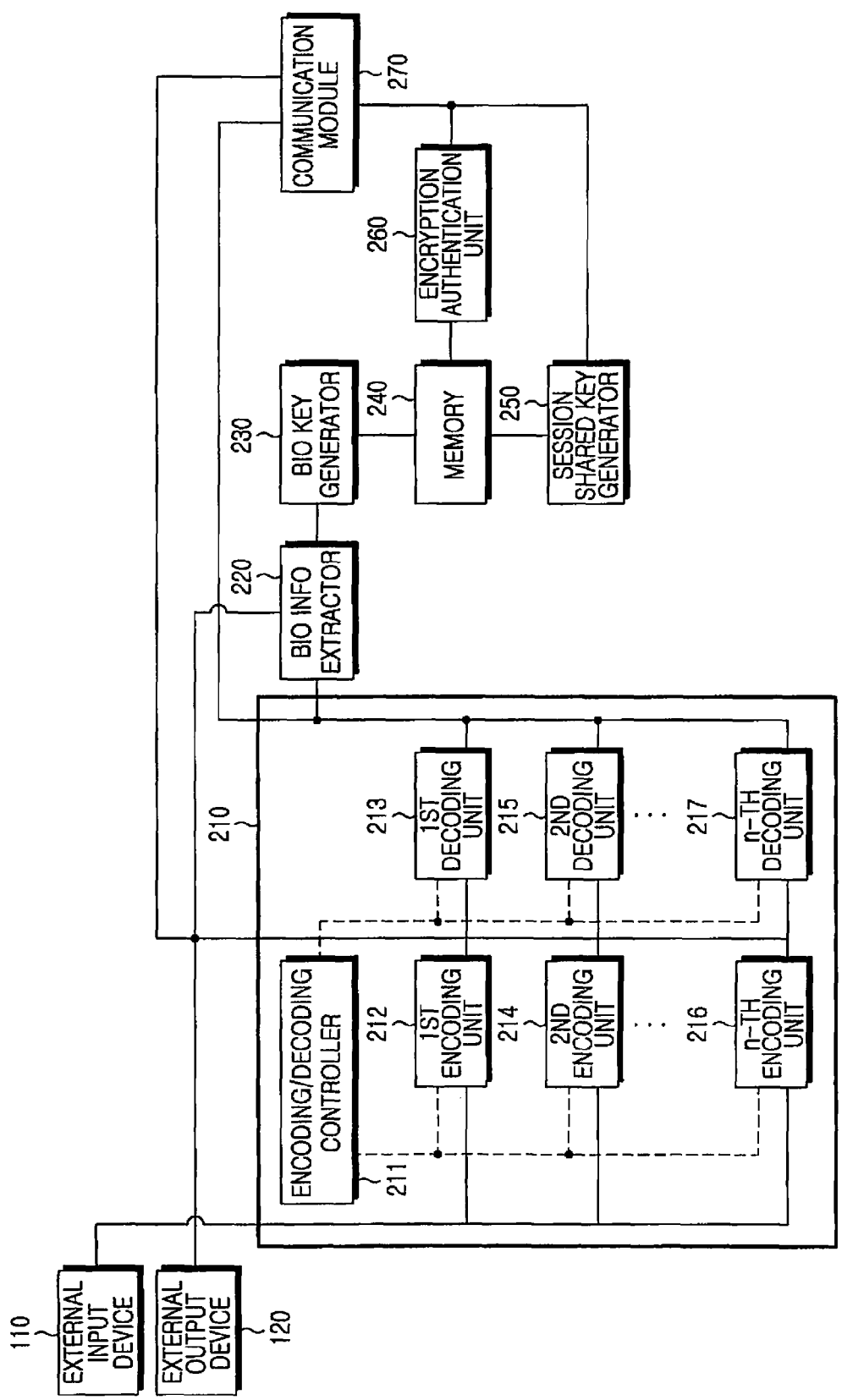
FIG. 1 illustrates a VoIP communication apparatus according to the present invention.

Hereinafter, preferred embodiments of the present invention will be described with reference to the accompanying drawings. Identical reference numerals indicate identical elements throughout the specification and drawings. In the following description, detailed explanation of known related functions and constitutions may be omitted for the sake of clarity and conciseness.

The terms and words used in the following description and claims are not limited to their dictionary meanings, but are merely used by the inventor to enable a clear and consistent understanding of the invention. Accordingly, it should be apparent to those skilled in the art that the following description is provided for illustration purposes only, and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 illustrates a VoIP communication apparatus according to the present invention.

Referring to FIG. 1, the VoIP communication apparatus includes an external input device 110, an external output device 120, an encoding/decoding module 210, a bio information extractor 220, a bio key generator 230, a memory 240, a session shared key generator 250, an encryption authentication unit 260, and a communication module 270.

The external input device 110, such as a microphone and/or a camera, receives video or audio signals for VoIP communication from a user. The external output device 120, such as a speaker and/or a display, outputs video or audio signals delivered from the counterpart user while performing VoIP communication.

The encoding/decoding module 210 encodes the video or audio signals received from the external input device 110 based on an encoding scheme (e.g. G.711, G.729, MPEG4, and H.264), and decodes the video or audio signals received through the communication module 270.

The encoding/decoding module 210 includes a plurality of encoding and decoding units 212-217 for performing encoding and decoding according to various encoding and decoding schemes supported by the VoIP communication apparatus, and an encoding/decoding controller 211 for controlling operation of the encoding and decoding units 212-217.

In an initial process of communication, the VoIP communication apparatus determines an encoding/decoding scheme to be used for communication. Then the encoding/decoding controller 211 selects an encoding unit that will encode video or audio signals generated from the external input device 110 during communication, based on the encoding scheme determined in the initial process, and also selects a decoding unit that will perform decoding based on the decoding scheme.

The counterpart VoIP communication apparatus in communication with the disclosed VoIP communication apparatus may support a variety of encoding/decoding schemes. The counterpart VoIP communication apparatus is identical in structure to the disclosed VoIP communication apparatus. Further, the disclosed VoIP communication apparatus encodes/decodes bio information extracted from the video or audio signals, and generates bio keys based on the resulting values. Since it is not possible to previously know the encoding/decoding scheme supported by the counterpart VoIP communication apparatus, the disclosed VoIP communication apparatus should generate a plurality of bio keys corresponding to the variety of encoding/decoding schemes supportable by the counterpart VoIP communication apparatus. Therefore, the encoding/decoding controller 211 controls inputs to the encoding and decoding units 212-217 so that a plurality of values corresponding to the plurality of encoding/decoding schemes can be output in response to one input video or audio signal, making it possible to generate a plurality of bio keys using received video or audio signals in a process of generating bio keys.

The bio information extractor 220 receives video or audio signals output from the encoding/decoding module 210 and the communication module 270, and extracts bio information indicating unique characteristics of each user, such as voiceprint, fingerprint, or iris information, from the received video or audio signals.

The bio key generator 230 generates digital keys including the extracted bio information, and stores them in the memory 240.

The session shared key generator 250 transmits the bio keys (or first bio keys) generated and stored in the disclosed VoIP communication apparatus to the counterpart VoIP communication apparatus through the communication module 270, and generates session shared keys by combining bio keys (or second bio keys) received from the counterpart VoIP communication apparatus. The session shared key generator 250 stores the second bio keys in the memory 240. For example, the session shared key generator 250 can generate the session shared keys based on a Diffie-Hellman algorithm.

The encryption authentication unit 260 is a means for performing encryption authentication on the session shared keys generated from the session shared key generator 250, and controls operations of the encoding/decoding module 210, the bio information extractor 220, and the bio key generator 230 so that bio information may be extracted from the data acquired by decoding received packet data and bio keys may be generated using the extracted bio information. Through the control of the encryption authentication unit 260, bio keys (hereinafter restored bio keys) decoded from received packet data are generated and stored in the memory 240. The encryption authentication unit 260 compares the second bio keys received for generation of the session shared keys with the restored bio keys, and determines whether they are identical to each other to authenticate whether their encryption was performed in orderly fashion.

The communication module 270 establishes a session used to perform VoIP-based communication with the counterpart VoIP communication apparatus, and then performs VoIP communication over the session. For the session establishment, the communication module 270 sends a call request to the counterpart VoIP communication apparatus and performs a negotiation on encoding and decoding schemes it will use for communication. The communication module 270 provides information on the encoding and decoding schemes determined through the negotiation, to the encoding/decoding module 210. The communication module 270 also encrypts or decrypts the packet data using the session shared keys generated by the session shared key generator 250.

The disclosed VoIP communication apparatus generates and stores bio keys in the memory in advance before it performs VoIP-based communication. The VoIP communication apparatus performs user authentication using the previously stored bio keys every time it performs VoIP-based communication. Accordingly, the disclosed VoIP communication apparatus may operate in a bio key establishment mode and a VoIP-based communication mode. Operation of the VoIP communication apparatus in each of the modes will now be described.

1. Bio Key Establishment Mode

Figure 2:
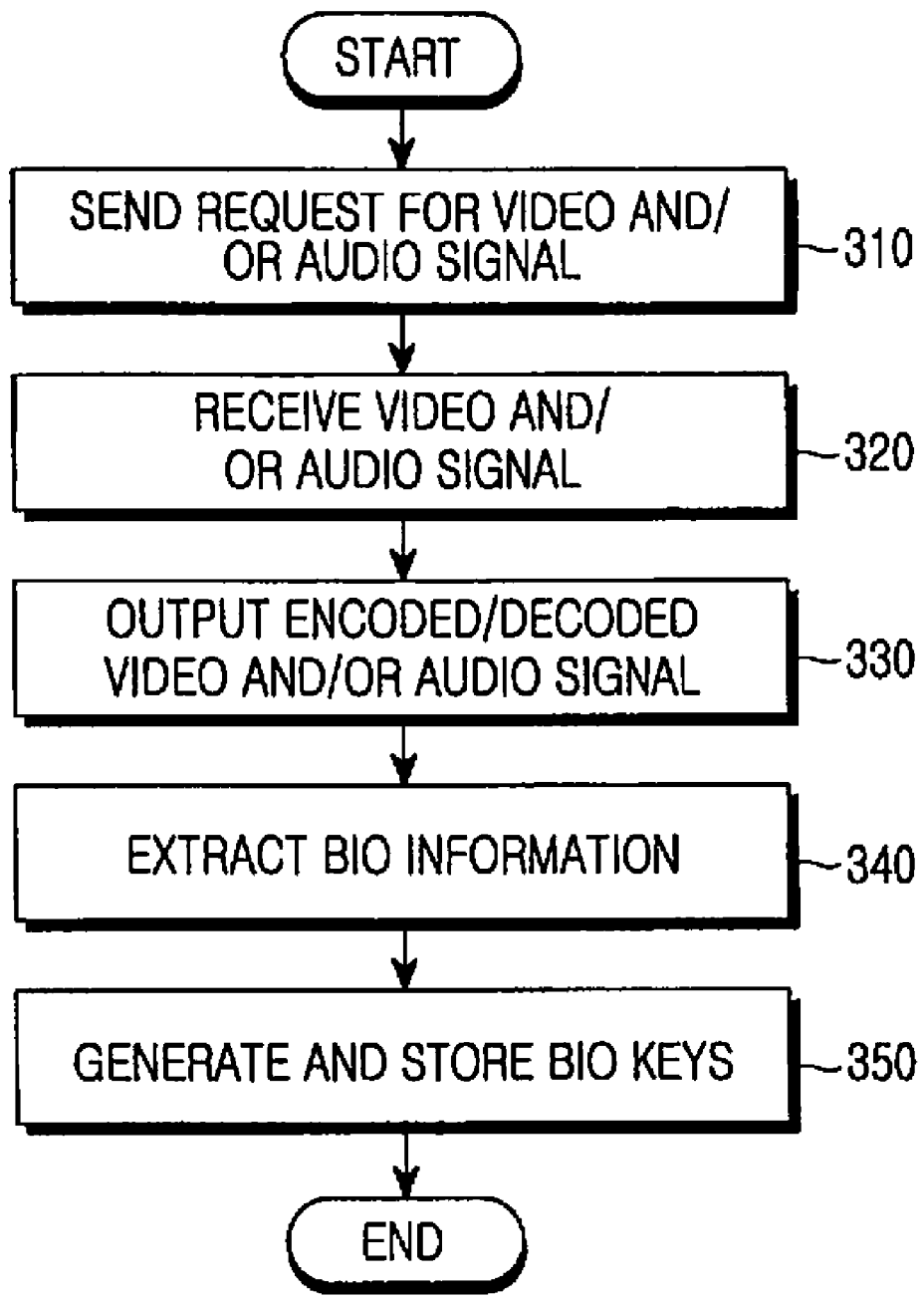
FIG. 2 illustrates a process of establishing bio keys in a VoIP communication method according to the present invention.

FIG. 2 illustrates a process of establishing bio keys in a VoIP communication method according to the present invention. Referring to FIGS. 1-2, as a user selects a bio key establishment function from among functions of the VoIP communication apparatus, a controller (not shown) sends a request for video or audio signals used for extraction of bio signals to the user through an external output device 120 in step 310. In response, the user inputs video or audio signals through an external input device 110 in step 320.

The video or audio signals received from the external input device 110 are input to an encoding/decoding module 210. An encoding/decoding controller 211 delivers the input video or audio signals to a first encoding unit 212, and controls the first encoding unit 212 and a first decoding unit 213 to encode and decode the video or audio signals.

Next, the encoding/decoding controller 211 delivers the input video or audio signals to a second encoding unit 214, and controls the second encoding unit 214 and a second decoding unit 215 to encode and decode the video or audio signals.

In this manner, the encoding/decoding controller 211 controls a plurality of encoding and decoding units 212-217 included in the encoding/decoding module 210 to repeat the foregoing process.

Here, the encoding and decoding units 212-217 perform different encoding and decoding schemes. Therefore, the encoding/decoding module 210, though it has received a single video or audio signal, sequentially outputs a plurality of video or audio signals which are encoded and decoded with different schemes by the encoding and decoding units 212-217, in step 330.

The plurality of encoded/decoded video or audio signals, which are sequentially output from the encoding/decoding module 210 through step 330, are provided to a bio information extractor 220.

In response, the bio information extractor 220 extracts bio information indicating unique characteristics of each user, such as voiceprint, fingerprint, and iris information, from the video or audio signals in step 340.

The extracted bio information is input to a bio key generator 230, which generates bio keys by applying the bio information to an algorithm that generates specific digital private keys, in step 350.

The bio keys that were generated using the video or audio signals encoded/decoded with different schemes are stored in a memory 240.

2. VoIP-Based Communication Mode

Figure 3:
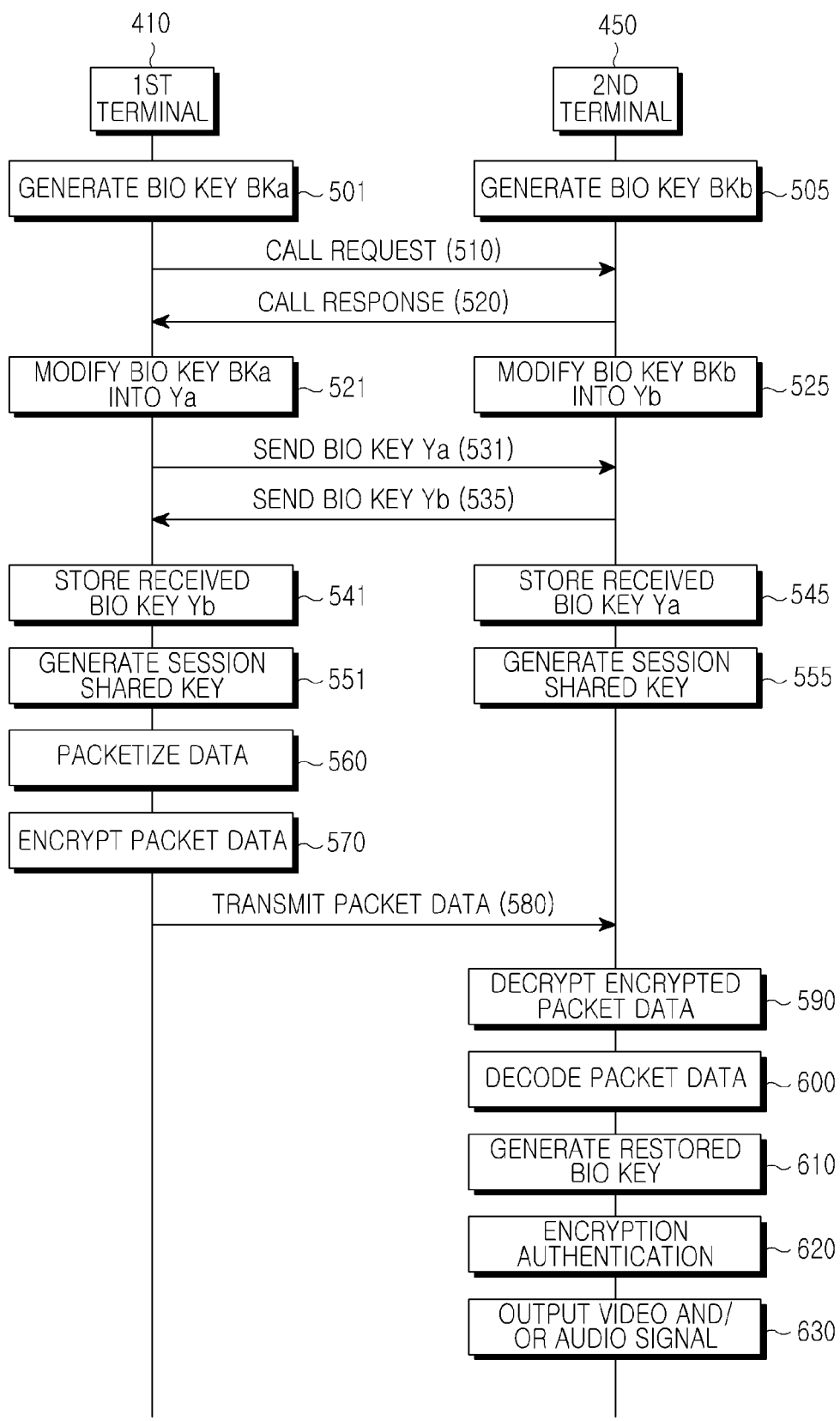
FIG. 3 illustrates a process of performing communication in a VoIP communication method according to the present invention.

FIG. 3 illustrates a process of performing communication in a VoIP communication method according to the present invention. Referring to FIGS. 1-3, before VoIP-based Communication Mode is started, in the bio key establishment mode, bio key generators 230 in the first and second terminals 410 and 450 generate first and second bio keys BKa and BKb in step 501 and 505 respectively. As a user requests VoIP-based communication by a first terminal 410 (or the disclosed VoIP communication apparatus), a controller (not shown) controls a communication module 270 to send a call request to a second terminal 450 (or the counterpart VoIP communication apparatus) in step 510, such as by an INVITE message. In response, the second terminal 450 sends a call response to the first terminal 410 in step 520. In the process of steps 510 and 520, the first and second terminals 410 and 450 set voice encoding/decoding schemes, such as G.711 and G.729, to be used for communication. The first and second terminals 410 and 450 set video encoding/decoding schemes, such as MPEG4 and H.264, when they support video communication.

When a media session starts after the signaling is performed, the session shared key generators 250 modify the generated bio keys BKa and BKb into bio keys Ya and Yb for generation of session shared keys in step 521 and 525 respectively. The modified first and second bio keys Ya and Yb can be generated by the computations of Equation (1).

$$Ya = p^{BKa} \cdot \bmod q$$

$$Yb = p^{BKb} \cdot \bmod q \qquad (1)$$

where p and q are predetermined constants.

After modifications of bio keys Ya and Yb are completed, session shared key generators 250 included in the first and second terminals 410 and 450 exchange bio keys stored in their terminals with each other based on a Diffie-Helman algorithm in steps 531 and 535.

Thereafter, the session shared key generator 250 in the first terminal 410 generates session shared keys by combining bio keys (or modified first bio keys Ya) previously stored in the memory 240 with newly received and stored second bio keys Yb, in step 551. For example, the session shared key generator 250 in the first terminal 410 can generate session shared keys K by the computation of Equation (2).

$$K = Yb^{BKa} \cdot \bmod q = (p^{BKb})^{BKa} \cdot \bmod q \qquad (2)$$

Similarly, a session shared key generator 250 in the second terminal 450 stores the first bio keys Ya, and generates session shared keys using the first bio keys Ya and the second bio keys Yb in step 555. The session shared key generator 250 in the second terminal 450 can generate session shared keys K by the computation of Equation (3). As a result, the session shared key generators 250 in the first and second terminals 410 and 450 generate the same session keys.

$$K = Ya^{BKb} \cdot \bmod q = (p^{BKa})^{BKb} \cdot \bmod q \qquad (3)$$

After the generation of the session shared keys is completed, the first terminal 410 starts a Secure Real-time Transport Protocol (SRTP) session. That is, when video or audio data is received from an external input device 110 provided in the first terminal 410, it is delivered to the encoding/decoding module 210, and an encoding/decoding controller 211 selects a first encoding unit 212 corresponding to an encoding scheme selected in a call setup process. Then the video or audio data from the external input device 110 is encoded by the first encoding unit 212, and is delivered to the communication module 270. In response, the communication module 270 packetizes the encoded video or audio data in step 560.

Next, the communication module 270 encrypts the packetized data (hereinafter packet data) using the session shared keys in step 570, and then transmits the encrypted packet data to the second terminal 450 in step 580.

The second terminal 450 receives the encrypted packet data through its communication module 270, and decrypts the packet data using the session shared keys in step 590.

The decrypted data is delivered to the encoding/decoding module 210, and the encoding/decoding controller 211 selects a first decoding unit 213 corresponding to the encoding scheme selected in the call setup process. The encoded video or audio data received from the communication module 270 is decoded by the first decoding unit 213 in step 600.

The decoded video or audio data may undergo encryption authentication before being transferred to an external output device 120. Specifically, a bio information extractor 220 extracts bio information from the decoded video or audio data in the same manner as in the bio key establishment mode. Thereafter, the bio key generator 230 generates a restored modified bio key using the extracted bio information, and stores them in the memory 240 in step 610.

The encryption authentication unit 260 compares the restored modified bio key with the first modified bio key Ya received in the process of generating the session shared keys, and determines whether they are identical to each other in step 620. The encryption authentication unit 260 determines that the encryption authentication was performed successfully, only when the restored bio key is identical to the received first modified bio key Ya.

Finally, when the encryption authentication is successfully performed, the encryption authentication unit 260 outputs the decoded video or audio data through the external output device 120 in step 630.

As is apparent from the foregoing description, according to the VoIP-based communication method and apparatus, a terminal can easily implement encryption on media data no matter whether the PKI is built. In addition, since key exchange and authentication is performed in a media session, the communication method and apparatus can be applied to a variety of signaling protocols. Further, the communication method and apparatus can generate digital keys using users' bio information, thus maintaining call security.

While the invention has been shown and described with reference to a certain preferred embodiments thereof, it will be understood by those skilled in the art that various changes in form and details may be made therein without departing from the spirit and scope of the invention as defined by the appended claims and their equivalents.

What is claimed is:

1. A method for performing an encrypted voice call between a first terminal and a second terminal, each supporting a Voice over Internet Protocol (VoIP)-based voice call, the method comprising:
   generating, by the first terminal, a first biographical (bio) key using bio information of a first user;
   generating, by the second terminal, a second bio key using bio information of a second user;
   sending, by the first terminal, a request for a voice call to the second terminal;
   sending, by the second terminal, a call response message to the first terminal, establishing a session between the first terminal and the second terminal;
   modifying, by the first terminal, the first bio key into a first modified bio key;
   modifying, by the second terminal, the second bio key into a second modified bio key;
   sending, by the first terminal, the first modified bio key to the second terminal;
   sending, by the second terminal, the second modified bio key to the first terminal;
   generating, by the first terminal, a session shared key using the first bio key and the second modified bio key;
   generating, by the second terminal, the session shared key using the second bio key and the first modified bio key;
   encrypting, by the first terminal, an encoded packet data using the session shared key;
   sending, by the first terminal, the encrypted packet data to the second terminal;
   decrypting, by the second terminal, the encrypted packet data using the session shared key;
   decoding, by the second terminal, the decrypted packet data;
   extracting, by the second terminal, bio information from the decoded packet data;
   generating, by the second terminal, a restored modified bio key using the extracted bio information; and
   authenticating, by the second terminal, the decoded packet data by comparing the restored modified bio key with the first modified bio key.

2. The method of claim 1, wherein generating the first or second bio key comprises:
   encoding and decoding the bio information; and
   generating a digitalized bio key by extracting information specific to the bio information.

3. The method of claim 1, wherein generating the first or second bio key comprises generating a plurality of bio keys that correspond to a plurality of respective encoding and decoding schemes.

4. The method of claim 3, further comprising selecting any one encoding and decoding scheme to be applied to communication, among the plurality of encoding and decoding schemes.

5. The method of claim 1, wherein the session shared key is generated based on a Diffie-Hellman algorithm.

6. The method of claim 1, wherein the bio information comprises voiceprint information included in a voice of a user.

7. A communication apparatus based on a Voice over Internet Protocol (VoIP), the apparatus comprising:
   an external input device for receiving an audio or video signal;
   an external output device for outputting an audio or video signal;
   an encoding module for encoding a signal from the external input device;
   a bio information extractor for extracting bio information from a signal output through the encoding and decoding module;
   a bio key generator for generating and managing a bio key using the bio information output from the bio information extractor;
   a session shared key generator for managing generation of a session shared key, wherein the session shared key is created in a Diffie-Hellman key exchange using the generated bio key and a modified bio key received from a counterpart communication apparatus;
   an encryption module for encrypting a first encoded packet data using the session shared key;
   a communication module for sending the first encrypted packet data to the counterpart communication apparatus and for receiving a second encrypted packet data from the counterpart communication apparatus;
   a decryption module for decrypting the second encrypted packet data using the session shared key;
   a decoding module for decoding the decrypted packet;
   the bio information extractor for further extracting bio information from the decoded packet data; and an encryption authentication unit for managing generation of a restored modified bio key using the bio information extracted from the decoded packet data and authenticating encryption by comparing the restored modified bio key with the modified bio key received from the counterpart communication apparatus.

8. The communication apparatus of claim 7, wherein the encoding module encodes the audio or video signal received for generation of the bio key.

9. The communication apparatus of claim 7, wherein the encoding module performs various encoding; and
wherein the bio key generator generates a plurality of bio keys corresponding to bio information that is encoded with respective encoding schemes.

10. The communication apparatus of claim 7, wherein the bio information comprises voiceprint information included in a voice of a user, and the bio information extractor extracts the voiceprint information included in a voice signal.

11. The communication apparatus of claim 7, wherein the encryption authentication unit controls the bio information extractor to extract the bio information from data received from the counterpart communication apparatus, and performs encryption authentication by determining whether the modified bio key is identical to the restored modified bio key.

12. A method for performing an encrypted voice call by a first terminal supporting a Voice over Internet Protocol (VoIP)-based voice call, the method comprising:
generating, by the first terminal, a first biographical (bio) key using bio information of a user;
sending a request for a voice call to a second terminal;
receiving a call response message from the second terminal, establishing a session between the first terminal and the second terminal;
modifying the first bio key into a first modified bio key;
sending the first modified bio key to the second terminal;
receiving a second modified bio key from the second terminal;
generating a session shared key using the first bio key and the second modified bio key;
encrypting an encoded packet data using the session shared key;
sending the encrypted packet data to the second terminal;
receiving a encrypted packet data from the second terminal;
decrypting the received encrypted packet data using the session shared key;
decoding the decrypted packet data;
extracting bio information from the decoded packet data;
generating a restored modified bio key using the extracted bio information; and
authenticating the decoded packet data by comparing the restored modified bio key with the second modified bio key of the second terminal.

13. A method for performing an encrypted voice call by a first terminal supporting a Voice over Internet Protocol (VoIP)-based voice call, the method comprising:
generating, by the first terminal, a first biographical (bio) key using bio information of a first user;
receiving a request for a voice call from the second terminal;
sending a call response message to the second terminal, establishing a session between the first terminal and the second terminal;
modifying the first bio key into a first modified bio key;
sending the first modified bio key to the second terminal;
receiving a second modified bio key from the second terminal;
generating a session shared key using the first bio key and the second modified bio key;
receiving an encrypted packet data from the second terminal;
decrypting the encrypted packet data using the session shared key;
decoding the decrypted packet data;
extracting bio information from the decoded packet data;
generating a restored modified bio key using the extracted bio information; and
authenticating the decoded packet data by comparing the restored modified bio key with the second modified bio key of the second terminal.

* * * * *